United States Patent
Gray

(10) Patent No.: US 12,413,816 B2
(45) Date of Patent: Sep. 9, 2025

(54) TRICK PLAY OF CONTENT OUTPUT

(71) Applicant: Comcast Cable Communications, LLC, Philadelphia, PA (US)

(72) Inventor: Brian Gray, Philadelphia, PA (US)

(73) Assignee: Comcast Cable Communications, LLC, Philadelphia, PA (US)

(*) Notice: Subject to any disclaimer, the term of this patent is extended or adjusted under 35 U.S.C. 154(b) by 0 days.

(21) Appl. No.: 18/620,498

(22) Filed: Mar. 28, 2024

(65) Prior Publication Data

US 2024/0244296 A1 Jul. 18, 2024

Related U.S. Application Data

(63) Continuation of application No. 17/985,491, filed on Nov. 11, 2022, now Pat. No. 11,974,016, which is a continuation of application No. 17/093,299, filed on Nov. 9, 2020, now Pat. No. 11,523,183.

(51) Int. Cl.
| | |
|---|---|
| H04N 21/454 | (2011.01) |
| H04N 21/439 | (2011.01) |
| H04N 21/44 | (2011.01) |
| H04N 21/6587 | (2011.01) |
| H04N 21/81 | (2011.01) |

(52) U.S. Cl.
CPC ..... *H04N 21/4542* (2013.01); *H04N 21/4394* (2013.01); *H04N 21/44008* (2013.01); *H04N 21/6587* (2013.01); *H04N 21/812* (2013.01)

(58) Field of Classification Search
CPC ........... H04N 21/4542; H04N 21/4394; H04N 21/44008; H04N 21/6587; H04N 21/812; H04N 21/435; H04N 21/47217; H04N 21/2387; H04N 21/23418; H04N 21/4751
USPC .......................................................... 725/28
See application file for complete search history.

(56) References Cited

U.S. PATENT DOCUMENTS

| | | | |
|---|---|---|---|
| 6,081,290 | A | 6/2000 | Schmidt et al. |
| 9,418,296 | B1* | 8/2016 | Kansara ........... H04N 21/23418 |
| 10,734,024 | B1 | 8/2020 | Soni et al. |
| 10,904,617 | B1 | 1/2021 | Labarre et al. |
| 2004/0221311 | A1 | 11/2004 | Dow et al. |
| 2006/0036783 | A1* | 2/2006 | Aarts ................. H04N 21/4532 |
| | | | 386/E5.052 |
| 2006/0238656 | A1 | 10/2006 | Chen et al. |
| 2009/0018845 | A1 | 1/2009 | Morel |
| 2009/0288112 | A1 | 11/2009 | Kandekar et al. |
| 2010/0319015 | A1 | 12/2010 | Remington et al. |
| 2012/0059697 | A1 | 3/2012 | Lin et al. |
| 2012/0278179 | A1 | 11/2012 | Campbell et al. |
| 2012/0311625 | A1 | 12/2012 | Nandi |
| 2015/0220635 | A1* | 8/2015 | Deen ..................... G06F 16/739 |
| | | | 707/740 |
| 2016/0253710 | A1 | 9/2016 | Publicover et al. |
| 2016/0295273 | A1 | 10/2016 | Ehlers et al. |
| 2018/0098101 | A1* | 4/2018 | Pont ................. H04N 21/44204 |
| 2019/0208282 | A1 | 7/2019 | Singh et al. |
| 2019/0339927 | A1 | 11/2019 | Gosu et al. |

(Continued)

*Primary Examiner* — Cynthia M Fogg
(74) *Attorney, Agent, or Firm* — Banner & Witcoff, Ltd.

(57) ABSTRACT

A user may have preferences regarding types of content that the user likes, or does not like, to see. The user may enter a trick play command to skip a current segment of a content item that the user is viewing, and the user's preferences may be used to cause output of a subsequent segment of the content item.

20 Claims, 9 Drawing Sheets

(56) References Cited

U.S. PATENT DOCUMENTS

| | | |
|---|---|---|
| 2020/0074481 A1 | 3/2020 | Zhang et al. |
| 2021/0073264 A1* | 3/2021 | Vaughn .................. G06N 20/00 |
| 2021/0211778 A1* | 7/2021 | Lockton ............... H04N 21/435 |
| 2021/0240434 A1 | 8/2021 | Kim et al. |
| 2022/0132215 A1 | 4/2022 | Venugopal et al. |
| 2022/0353588 A1* | 11/2022 | Sookne ................ H04N 21/472 |

* cited by examiner

```
sandbox > {
  (1) sample_metadata.json > {
    "audio_descriptions": [{
      "battle_scene_1": {
        "offsets": [2700, 20000],
        "audio": [
          {"speed": 0, "direction":"forward", "file":"battle_scene_1_fw0.wav"},
          {"speed": 0, "direction":"reverse", "file":"battle_scene_1_rv0.wav"},
          {"speed": 2, "direction":"forward", "file":"battle_scene_1_fw2.wav"},
          {"speed": 2, "direction":"reverse", "file":"battle_scene_1_rv2.wav"},
          {"speed": 4, "direction":"forward", "file":"battle_scene_1_fw4.wav"},
          {"speed": 4, "direction":"reverse", "file":"battle_scene_1_rv4.wav"},
          {"speed": 8, "direction":"forward", "file":"battle_scene_1_fw8.wav"},
          {"speed": 8, "direction":"reverse", "file":"battle_scene_1_rv8.wav"}
        ]
      },
      "sex_scene_1": {
        "offsets": [2700, 30000],
        "audio": [
          {"speed": 0, "direction":"forward", "file":"sex_scene_1_fw0.wav"},
          {"speed": 0, "direction":"reverse", "file":"sex_scene_1_rv0.wav"},
          {"speed": 2, "direction":"forward", "file":"sex_scene_1_fw2.wav"},
          {"speed": 2, "direction":"reverse", "file":"sex_scene_1_rv2.wav"},
          {"speed": 4, "direction":"forward", "file":"sex_scene_1_fw4.wav"},
          {"speed": 4, "direction":"reverse", "file":"sex_scene_1_rv4.wav"},
          {"speed": 8, "direction":"forward", "file":"sex_scene_1_fw8.wav"},
          {"speed": 8, "direction":"reverse", "file":"sex_scene_1_rv8.wav"}
        ]
      }
    }]
  }
}
```

FIG. 8

TRICK PLAY OF CONTENT OUTPUT

CROSS-REFERENCE TO RELATED APPLICATIONS

This application is a continuation of and claims priority to U.S. patent application Ser. No. 17/985,491, filed Nov. 11, 2022, which is a continuation of U.S. patent application Ser. No. 17/093,299, filed Nov. 9, 2020, which is hereby incorporated by reference in its entirety.

BACKGROUND

Digital video systems may provide trick play (or trick mode) features such as fast-forward and reverse play at multiple speeds (e.g., 2×, 4×, 8×). During trick play, audio output may be disabled. As a result, some viewers may have difficulty determining when to end a trick play operation. For example, visually-impaired users may not be able to see video sufficiently clearly to notice when a content portion being fast-forwarded or rewound is reaching an end, and thus may not be able to know when to stop trick play. Even if there is audio that is output during a trick play operation, it may not be possible, based on that audio, to determine when to stop trick play.

SUMMARY

The following summary presents a simplified summary of certain features. The summary is not an extensive overview and is not intended to identify key or critical elements.

Systems, apparatuses, and methods are described for providing audio assistance during trick play. Accessibility feature settings may be provided to users to enable and customize audio assistance during trick play. The audio assistance may comprise outputting one or more audio cues during the trick play. The audio cues may indicate the progress of a trick play content item and/or may be associated with one or more types of scenes. Based on the audio cues, users (e.g., visually-impaired users), may be informed when to stop trick play operations and so as to resume watching the video content. The audio cues may also indicate automatic skipping of a scene or commercial that a user wishes to avoid and the output of a next scene that the user wishes to watch or hear.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 8 shows a sample metadata file for audio assistance during trick play.

DETAILED DESCRIPTION

Figure 1:
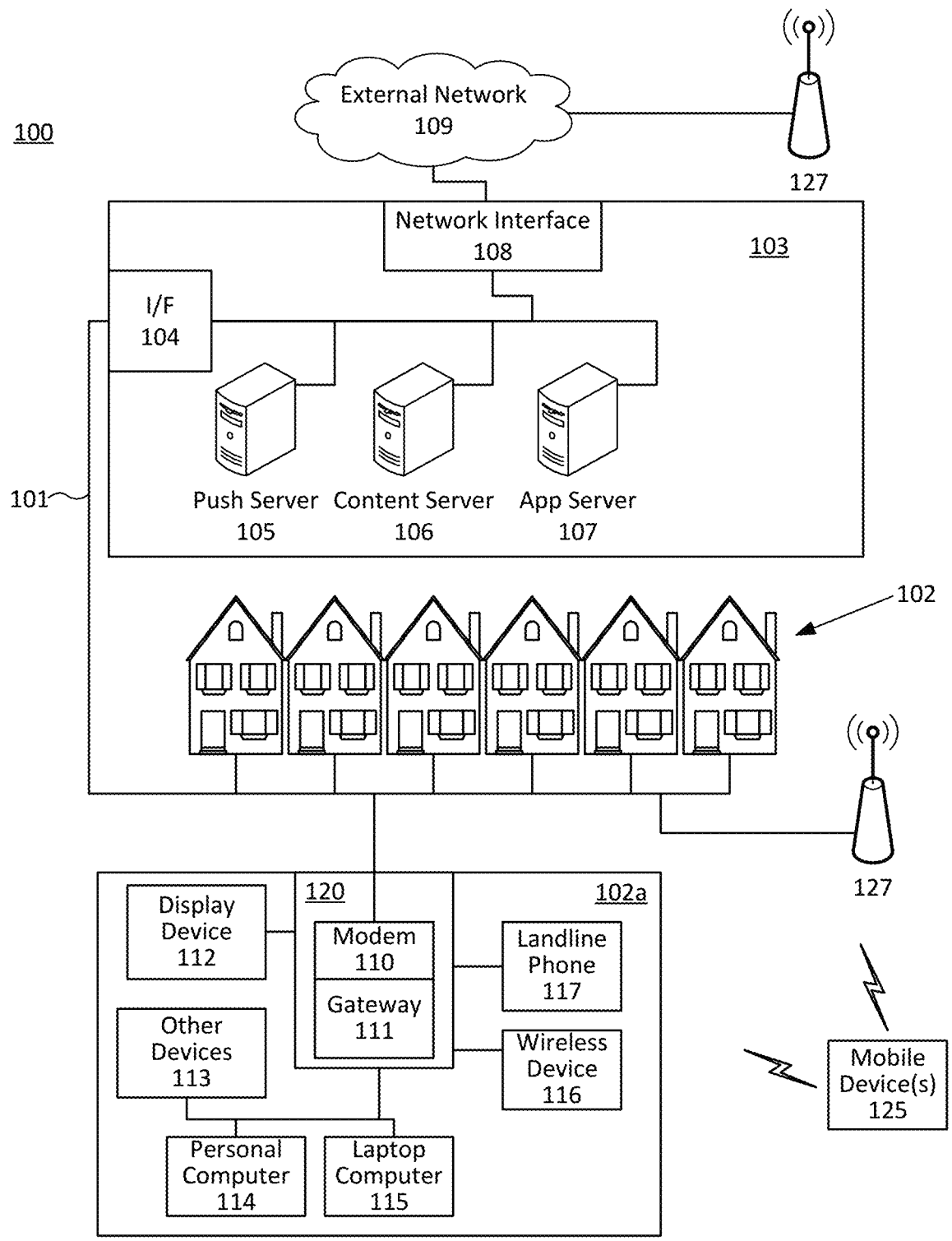
FIG. 1 shows an example communication network.

The accompanying drawings, which form a part hereof, show examples of the disclosure. It is to be understood that the examples shown in the drawings and/or discussed herein are non-exclusive and that there are other examples of how the disclosure may be practiced.

FIG. 1 shows an example communication network 100 in which features described herein may be implemented. The communication network 100 may comprise one or more information distribution networks of any type, such as, without limitation, a telephone network, a wireless network (e.g., an LTE network, a 5G network, a WiFi IEEE 802.11 network, a WiMAX network, a satellite network, and/or any other network for wireless communication), an optical fiber network, a coaxial cable network, and/or a hybrid fiber/coax distribution network. The communication network 100 may use a series of interconnected communication links 101 (e.g., coaxial cables, optical fibers, wireless links, etc.) to connect multiple premises 102 (e.g., businesses, homes, consumer dwellings, train stations, airports, etc.) to a local office 103 (e.g., a headend). The local office 103 may send downstream information signals and receive upstream information signals via the communication links 101. Each of the premises 102 may comprise devices, described below, to receive, send, and/or otherwise process those signals and information contained therein.

The communication links 101 may originate from the local office 103 and may comprise components not shown, such as splitters, filters, amplifiers, etc., to help convey signals clearly. The communication links 101 may be coupled to one or more wireless access points 127 configured to communicate with one or more mobile devices 125 via one or more wireless networks. The mobile devices 125 may comprise smart phones, tablets or laptop computers with wireless transceivers, tablets or laptop computers communicatively coupled to other devices with wireless transceivers, and/or any other type of device configured to communicate via a wireless network.

The local office 103 may comprise an interface 104. The interface 104 may comprise one or more computing devices configured to send information downstream to, and to receive information upstream from, devices communicating with the local office 103 via the communications links 101. The interface 104 may be configured to manage communications among those devices, to manage communications between those devices and backend devices such as servers 105-107, and/or to manage communications between those devices and one or more external networks 109. The interface 104 may, for example, comprise one or more routers, one or more base stations, one or more optical line terminals (OLTs), one or more termination systems (e.g., a modular cable modem termination system (M-CMTS) or an integrated cable modem termination system (I-CMTS)), one or more digital subscriber line access modules (DSLAMs), and/or any other computing device(s). The local office 103 may comprise one or more network interfaces 108 that comprise circuitry needed to communicate via the external networks 109. The external networks 109 may comprise networks of Internet devices, telephone networks, wireless networks, wired networks, fiber optic networks, and/or any other desired network. The local office 103 may also or alternatively communicate with the mobile devices 125 via the interface 108 and one or more of the external networks 109, e.g., via one or more of the wireless access points 127.

The push notification server 105 may be configured to generate push notifications to deliver information to devices in the premises 102 and/or to the mobile devices 125. The content server 106 may be configured to provide content to devices in the premises 102 and/or to the mobile devices 125. This content may comprise, for example, video, audio, text, web pages, images, files, etc. The content server 106 (or, alternatively, an authentication server) may comprise software to validate user identities and entitlements, to locate and retrieve requested content, and/or to initiate delivery (e.g., streaming) of the content. The application server 107 may be configured to offer any desired service. For example, an application server may be responsible for collecting, and generating a download of, information for electronic program guide listings. Another application server may be responsible for monitoring user viewing habits and collecting information from that monitoring for use in providing supplemental audio or selecting advertisements. Yet another application server may be responsible for formatting and inserting advertisements in a video stream being transmitted to devices in the premises 102 and/or to the mobile devices 125. Yet another application server may be responsible for formatting and inserting supplemental audio into a video stream being transmitted to devices in the premises 102 and/or to the mobile devices 125. The local office 103 may comprise additional servers, such as additional push, content, and/or application servers, and/or other types of servers. Although shown separately, the push server 105, the content server 106, the application server 107, and/or other server(s) may be combined. The servers 105, 106, and 107, and/or other servers, which may also or alternatively be located in the external network 109, may be computing devices and may comprise memory storing data and also storing computer executable instructions that, when executed by one or more processors, cause the server(s) to perform steps described herein.

An example premises 102a may comprise an interface 120. The interface 120 may comprise circuitry used to communicate via the communication links 101. The interface 120 may comprise a modem 110, which may comprise transmitters and receivers used to communicate via the communication links 101 with the local office 103. The modem 110 may comprise, for example, a coaxial cable modem (for coaxial cable lines of the communication links 101), a fiber interface node (for fiber optic lines of the communication links 101), a twisted-pair telephone modem, a wireless transceiver, and/or any other desired modem device. One modem is shown in FIG. 1, but a plurality of modems operating in parallel may be implemented within the interface 120. The interface 120 may comprise a gateway 111. The modem 110 may be connected to, or be a part of, the gateway 111. The gateway 111 may be a computing device that communicates with the modem(s) 110 to allow one or more other devices in the premises 102a to communicate with the local office 103 and/or with other devices beyond the local office 103 (e.g., via the local office 103 and the external network(s) 109). The gateway 111 may comprise a set-top box (STB), digital video recorder (DVR), a digital transport adapter (DTA), a computer server, and/or any other desired computing device.

The gateway 111 may also comprise one or more local network interfaces to communicate, via one or more local networks, with devices in the premises 102a. Such devices may comprise, e.g., display devices 112 (e.g., televisions), other devices 113 (e.g., a DVR or STB), personal computers 114, laptop computers 115, wireless devices 116 (e.g., wireless routers, wireless laptops, notebooks, tablets and netbooks, cordless phones (e.g., Digital Enhanced Cordless Telephone-DECT phones), mobile phones, mobile televisions, personal digital assistants (PDA)), landline phones 117 (e.g., Voice over Internet Protocol VoIP phones), and any other desired devices. Example types of local networks comprise Multimedia Over Coax Alliance (MoCA) networks, Ethernet networks, networks communicating via Universal Serial Bus (USB) interfaces, wireless networks (e.g., IEEE 802.11, IEEE 802.15, Bluetooth), networks communicating via in-premises power lines, and others. The lines connecting the interface 120 with the other devices in the premises 102a may represent wired or wireless connections, as may be appropriate for the type of local network used. One or more of the devices at the premises 102a may be configured to provide wireless communications channels (e.g., IEEE 802.11 channels) to communicate with one or more of the mobile devices 125, which may be on- or off-premises.

The mobile devices 125, one or more of the devices in the premises 102a, and/or other devices may receive, store, output, and/or otherwise use assets. An asset may comprise a video, a game, one or more images, software, audio, text, webpage(s), and/or other content.

Figure 2:
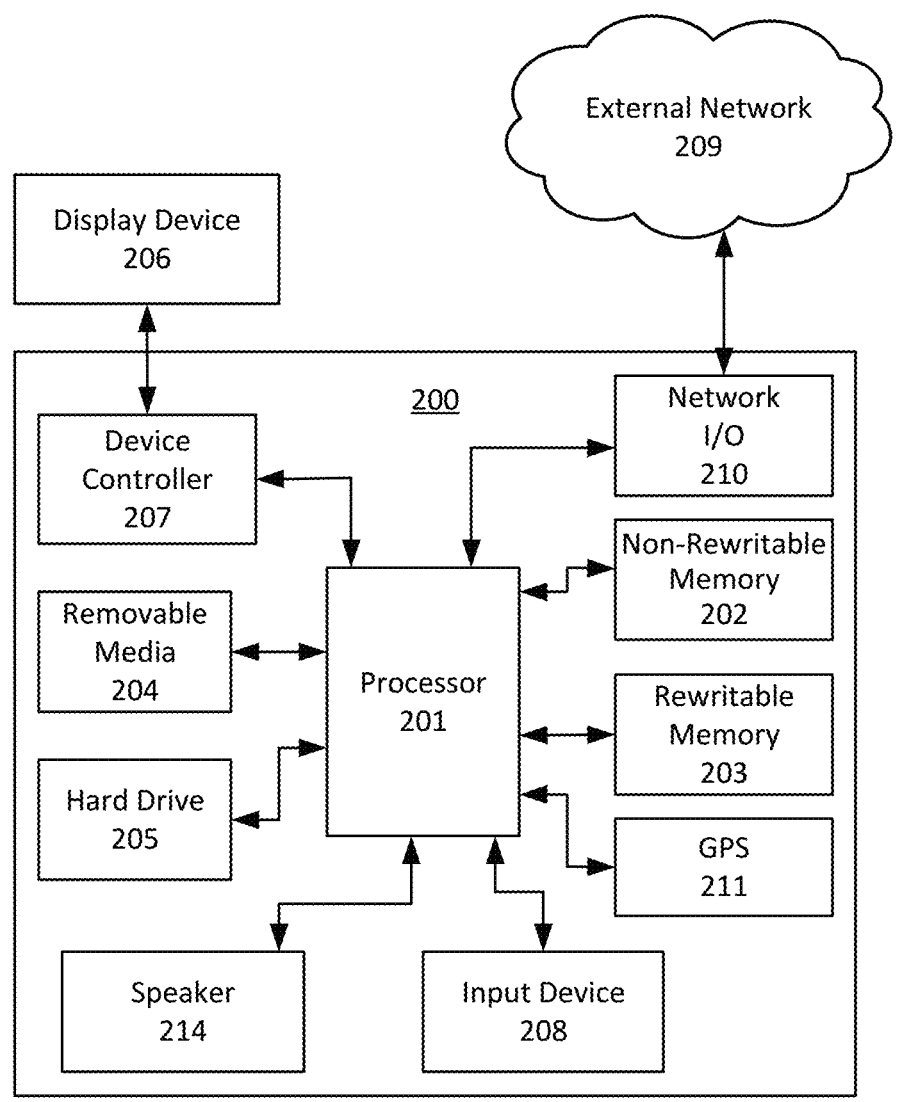
FIG. 2 shows hardware elements of a computing device.

FIG. 2 shows hardware elements of a computing device 200 that may be used to implement any of the computing devices shown in FIG. 1 (e.g., the mobile devices 125, any of the devices shown in the premises 102a, any of the devices shown in the local office 103, any of the wireless access points 127, any devices with the external network 109) and any other computing devices discussed herein. The computing device 200 may comprise one or more processors 201, which may execute instructions of a computer program to perform any of the functions described herein. The instructions may be stored in a non-rewritable memory 202 such as a read-only memory (ROM), a rewritable memory 203 such as random access memory (RAM) and/or flash memory, removable media 204 (e.g., a USB drive, a compact disk (CD), a digital versatile disk (DVD)), and/or in any other type of computer-readable storage medium or memory. Instructions may also be stored in an attached (or internal) hard drive 205 or other types of storage media. The computing device 200 may comprise one or more output devices, such as a display device 206 (e.g., an external television and/or other external or internal display device) and a speaker 214, and may comprise one or more output device controllers 207, such as a video processor or a controller for an infra-red or BLUETOOTH transceiver. One or more user input devices 208 may comprise a remote control, a keyboard, a mouse, a touch screen (which may be integrated with the display device 206), microphone, etc. The computing device 200 may also comprise one or more network interfaces, such as a network input/output (I/O) interface 210 (e.g., a network card) to communicate with an external network 209. The network I/O interface 210 may be a wired interface (e.g., electrical, RF (via coax), optical (via fiber)), a wireless interface, or a combination of the two. The network I/O interface 210 may comprise a modem configured to communicate via the external network 209. The external network 209 may comprise the communication links 101 discussed above, the external network 109, an in-home network, a network provider's wireless, coaxial, fiber, or hybrid fiber/coaxial distribution system (e.g., a DOCSIS network), or any other desired network. The computing device 200 may comprise a location-detecting device, such as a global positioning system (GPS) microprocessor 211, which may be configured to receive and process global positioning signals and determine, with possible assistance from an external server and antenna, a geographic position of the computing device 200.

Although FIG. 2 shows an example hardware configuration, one or more of the elements of the computing device 200 may be implemented as software or a combination of hardware and software. Modifications may be made to add, remove, combine, divide, etc. components of the computing device 200. Additionally, the elements shown in FIG. 2 may be implemented using basic computing devices and components that have been configured to perform operations such as are described herein. For example, a memory of the computing device 200 may store computer-executable instructions that, when executed by the processor 201 and/or one or more other processors of the computing device 200, cause the computing device 200 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a display buffer.

FIGS. 3-6 show examples of user interfaces with different hierarchies for presenting user preference information related to accessibility features. The accessibility features (e.g., audio cues, video description, audio description) may be provided to users when a trick play operation (e.g., fast-forwarding, reverse, skipping ahead/behind, pause) is performed with regard to content that is being transmitted to user devices. The accessibility features may provide a better experience for users, for example, visually-impaired users, consuming the content.

One or more applications executing on a computing device (e.g., the gateway 111, the display device 112, the other devices 113, the personal computer 114, the laptop computer 115, the wireless device 116) may output the user interfaces shown in FIGS. 3-6, and/or receive inputs, from users and via these user interfaces, related to the accessibility features. Additionally or additionally, the one or more applications may provide access to content items, allow selection of content items, and/or allow control of output of content items (e.g., by sending communications to the local office 103 to cause sending content items and/or trick play).

In FIGS. 3-6, one or more lists of selectable options may be arranged vertically on the user interfaces. Other types of layouts of the options, such as horizontally arranging the options, may also or alternatively be presented on the user interfaces. The user interfaces may have different appearances from those shown in the figures herein, depending upon the implementations thereof. Options that may be provided in a menu or other user interface are not limited to the options shown in FIGS. 3-6, and other options may also or alternatively be displayed on any of the user interfaces presented herein.

The user interfaces may be a menu-based system that provides a variety of options associated with the accessibility features for user selection. The user interfaces may be part of one or more configuration/set-up interfaces for applications that may be used to view and/or select content (e.g., a program guide). Moreover, the user interfaces may comprise information related to the settings of the programs (e.g., videos, audios, webpages, commercials, and/or texts). Further, the user interfaces may be voice-enabled. For example, the options on the user interfaces may be navigated and selected by users using voice control. A talking guide may help the users understand the content on the user interfaces. Therefore, visually-impaired users may more easily select their preferred settings for audio assistance during trick play.

Figure 3:
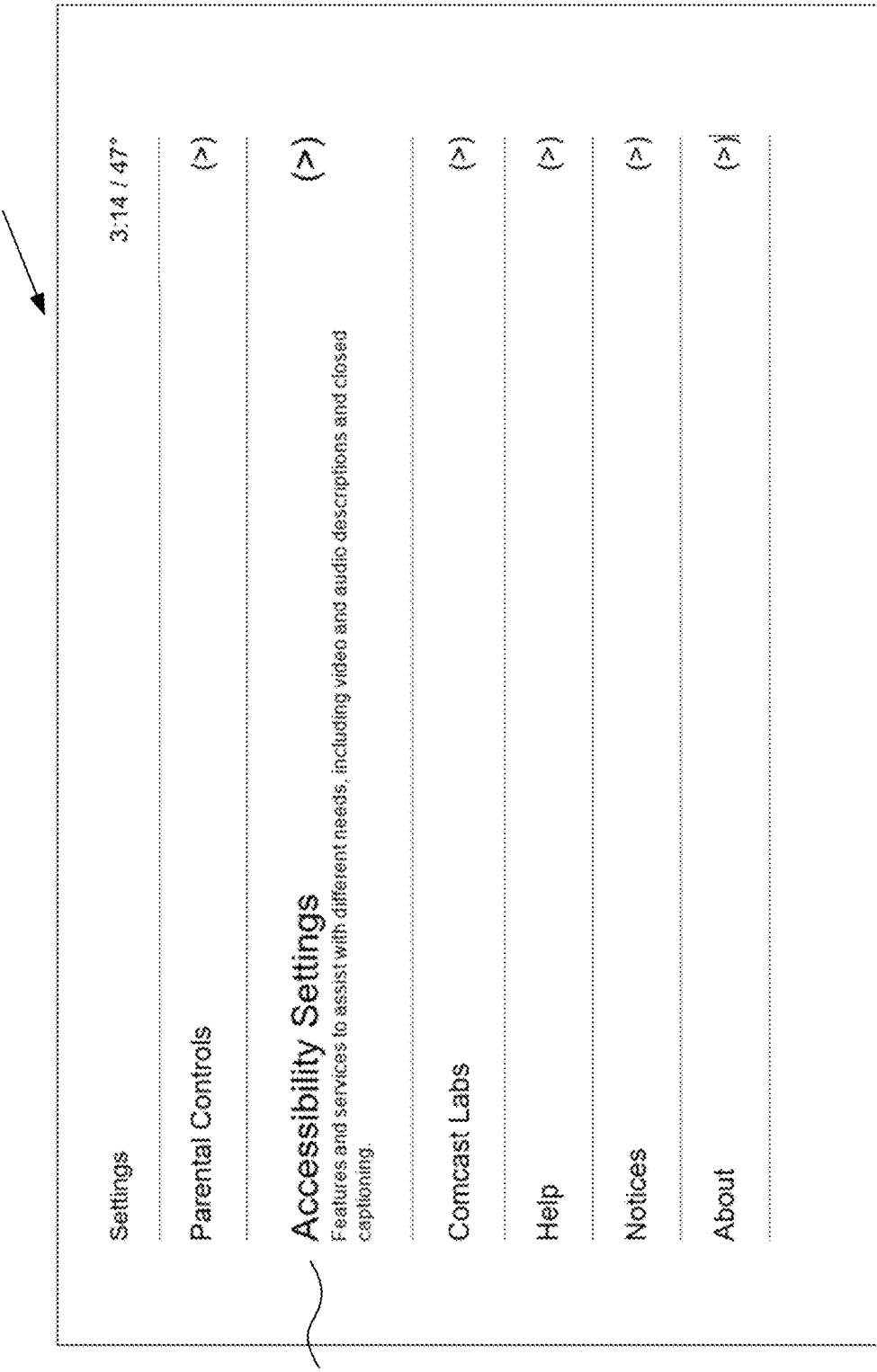
FIG. 3 shows an example interface for general settings.

FIG. 3 shows an example of a user interface that may provide options for setting general user preferences. In FIG. 3, a user interface 310 may comprise an option 301 for accessibility settings. The accessibility settings option 301 may be selected to set, modify, and/or otherwise configure settings for features and/or services that may assist users (e.g., persons with disabilities) having different needs. For example, the accessibility settings option 301 may comprise settings that control and/or otherwise relate to one or more audio cues that may be provided during trick play, that control and/or otherwise relate to video and/or audio descriptions, and/or that control and/or otherwise relate to closed captions for different programs and content items. A detailed example of the accessibility settings option 301 is shown in FIG. 4.

Figure 4:
FIG. 4 shows an example interface for accessibility settings.

FIG. 4 shows an example of a user interface that may comprise options a user may select and/or otherwise interact with to select, modify, control, or otherwise configure settings related to accessibility features. A user interface 410 may be at a lower level of the user interface hierarchies than the user interface 310 (e.g., a next page of the user interface 310 if the accessibility settings option 301 is selected). The user interface 410 may comprise an option that a user may select (e.g., by highlighting with a cursor movable with a remote control and pressing a "select" or "enter" button) to enable or disable a closed captioning feature. The user interface 410 may comprise an option that a user may select to go to one or more other menu screens to access one or more options to set/modify closed captioning settings. The user interface 410 may comprise an option 401 that a user may select to enable or disable an audio assistance feature. The user interface 410 may comprise an option 403 that a user may select to go to one or more other menu screens to access one or more options to set/modify one or more settings for audio assistance features. Details of the option 403 are described in connection with FIGS. 5 and 6. The user interface 410 may comprise an option that a user may select to enable or disable a video description feature. The user interface 410 may comprise an option that a user may select to enable or disable a voice guidance beta feature.

Figure 5:
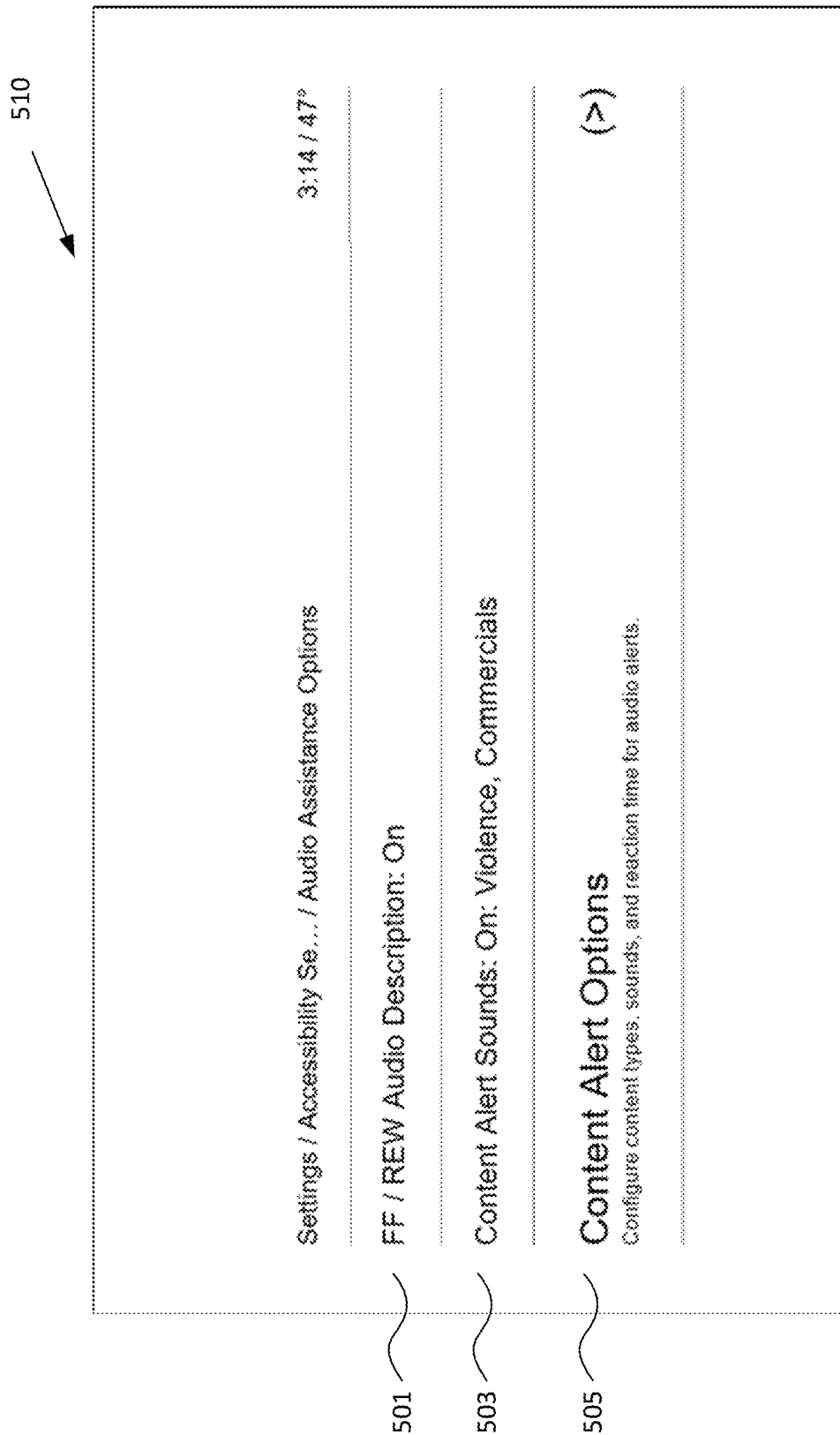
FIG. 5 shows an example interface for audio assistance settings.

FIG. 5 shows an example of a user interface that may comprise options a user may select and/or otherwise interact with to select, modify, control, or otherwise configure settings related to audio assistance. A user interface 510 may be at a lower level of the user interface hierarchies than the user interface 410 (e.g., a next page of the user interface 410 if the option 403 is selected). The user interface 510 may comprise an option 501 that a user may select to enable or disable an audio assistance during trick play feature. This feature, if enabled, may allow and/or cause supplemental audio (e.g., content alert sounds) to be output during trick play to provide information related to the content of the video. The audio assistance during trick play feature is further described below.

The user interface 510 may comprise an option 503 that a user may select to enable or disable supplemental audio based on content types (e.g., different types of scenes and/or commercials, commercials with different lengths) of portions of content items (e.g., video programs). The option 503 may be enabled by a user to provide audio cues (e.g., audio indicators, audio alerts, audio messages) related to different types of content during playback of the content.

The user interface 510 may comprise a content alert option 505 that a user may select to go to one or more other menu screens to access one or more options to set/modify one or more settings for audio cues. The content alert option 505 may provide a detailed selection of options for users to select preferred sounds associated with one or more content types and one or more reaction times for the audio cues. Details of the content alert settings will be described in connection with FIG. 6.

Figure 6:
FIG. 6 shows an example interface for content alerts settings.

FIG. 6 shows an example of a user interface that may comprise options a user may select and/or otherwise interact with to select, modify, control, or otherwise configure settings related to audio cues. A user interface 610 may be at a lower level of the user interface hierarchies than the user interface 510 (e.g., a next page of the user interface 510 if the content alert option 505 is selected). The user interface 610 may comprise options a user may select and/or otherwise interact with to select, modify, control, or otherwise configure one or more audio cues associated with one or more content types. For example, the user interface 610 may comprise an option 601 that a user may select to enable or disable audio cues associated with violent content, an option 603 that a user may select to enable or disable audio cues associated with sexual content, and/or an option 605 that a user may select to enable or disable audio cues associated with commercials. For example, the option 601 may be enabled by a user to cause a computing device (e.g., the gateway 111, the display device 112, the other devices 113, the personal computer 114, the laptop computer 115, the wireless device 116) to provide one or more audio cues when a violent scene is being output or will be output. Similarly, the option 603 may be enabled by a user to cause the computing device to provide one or more audio cues when a sexual scene is being output or will be output. The option 605 may be enabled by a user to cause the computing device to provide one or more audio cues when a commercial is being output or will be output.

The user interface 610 may comprise an option 607 that allows users to choose an alert sound type for the audio cues. For example, the audio cues may comprise verbal audio cues (e.g., audio output of pre-recorded words describing what is happening such as "ad skipping," "violent scene skipping," "jumping to next scene"), and/or non-verbal audio cues (e.g., beeps, tones). The user interface 610 may allow the user to select the option 607 to select, modify, control, or otherwise configure the sound of the audio cues. The user interface 610 may further allow users to customize the sound of the beep and select, for example, a high-pitch tone, a low-pitch tone, a machine-generated sound, or a human voice for the beep.

Additionally or alternatively, the option 607 may allow users to customize the verbal audio cues. The verbal audio cues may be associated with one or more content types, which may comprise a plurality of types of scenes and commercials. The plurality of scenes or other portions of content may be categorized by type of content depicted in the scene/portion. Content types may comprise violent, sexual, bloody/gory, adult language, drug/alcohol/tobacco-related, car chase, battle scenes, and/or other types of content.

When a type of content is being skipped (e.g., fast-forwarding through the content, jumping a set amount of time, jumping directly to next scene), an audio cue associated with the type of content may be output based on the settings on the user interface 610. For example, if a user enables the audio cue for violent content and sets the alert sounds type for the audio cue to be a beep, a beep may be output before a violent scene ends during trick play (e.g., if the user is fast-forwarding through the violent scene). In this way, the user may know when to stop the trick play operation based on the beep and enjoy the next scene. As another example, a beep may be output shortly before a start of a violent scene, so that the user may skip the next scene together with the current scene during trick play.

Further, the user interface 610 may comprise an option 609 that a user may select to enable or disable auto-play at end of skipped content. If this feature is enabled, a next portion (e.g., a portion of the content item immediately following the current portion of the content item) of the content item may, without any further user input (e.g., stop fast-forwarding, choose the next program), automatically start playing at the end of the skipped current portion of the content item. The option 609 may be triggered by a trick play command. For example, when a computing device (e.g., the application server 107, the other devices 113) receives a trick play command to skip a portion of a content item, the portion of the content item may be immediately skipped or skipped after a threshold of time (e.g., 2 seconds, 3 seconds) and a next portion of the content item may be automatically output at the end of the skipped content.

The user interface 610 may comprise an option 611 a user may select and/or otherwise interact with to select, modify, control, or otherwise configure settings related to a reaction time. The reaction time may measure the amount of time to respond to an audio cue. The reaction time may be set by a user and/or may be updated based on crowdsourced data gathered from a plurality of users. Additionally or alternatively, the reaction time may be initially set by a computing device (e.g., the application server 107, the other devices 113, the gateway 111, display device 112, the other devices 113, personal computer 114, laptop computer 115, wireless device 116) and later modified by a user. During the output of the content and the related audio cues, the computing device may gather actual user reaction times responding to one or more audio cues, and determine and update the reaction time 611 based on the gathered user behaviors. The reaction time is further described in connection with FIG. 7B.

Figure 7A:
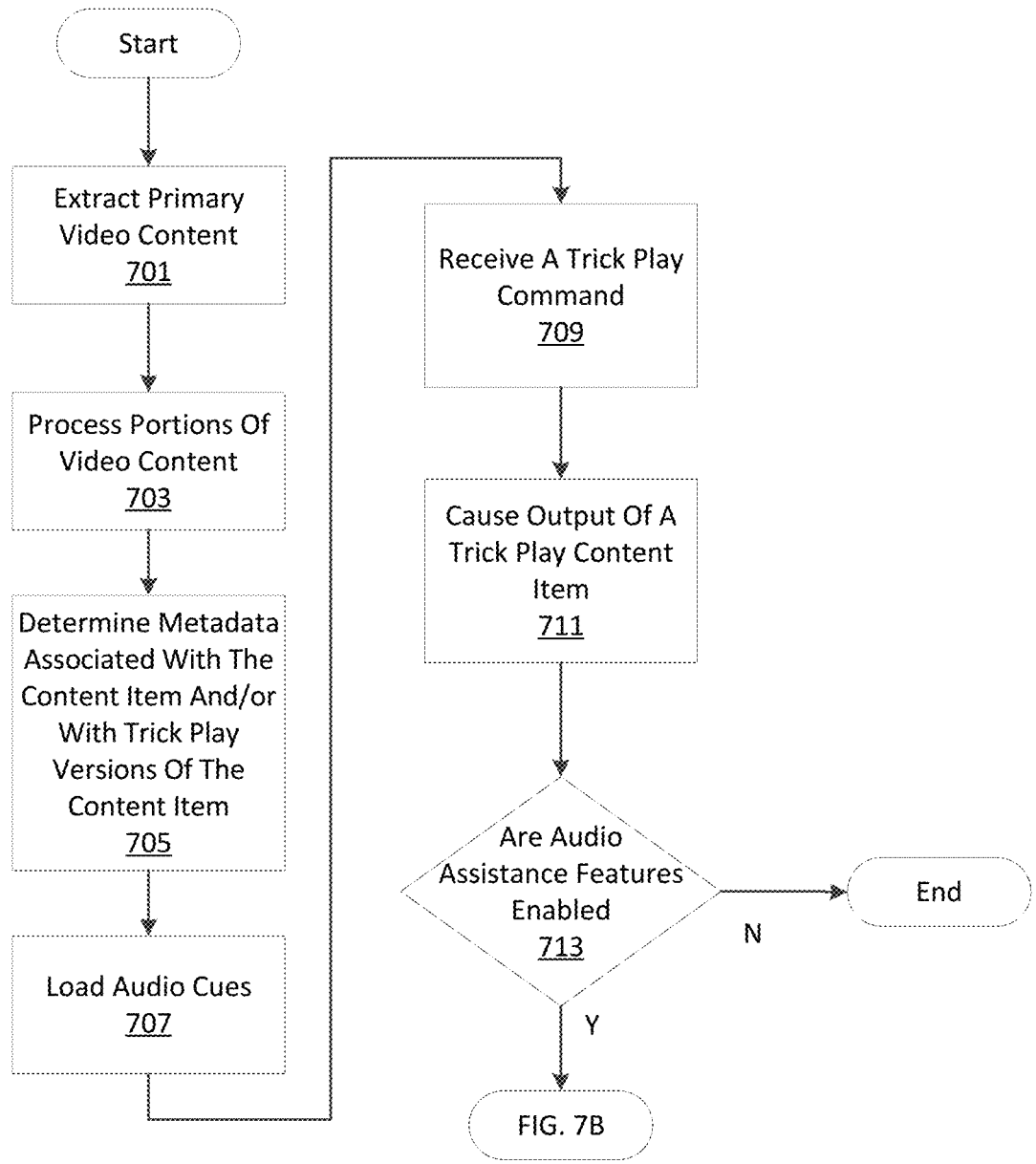
FIGS. 7A-7B are flow charts showing an example method for audio assistance during trick play.
Figure 7B:
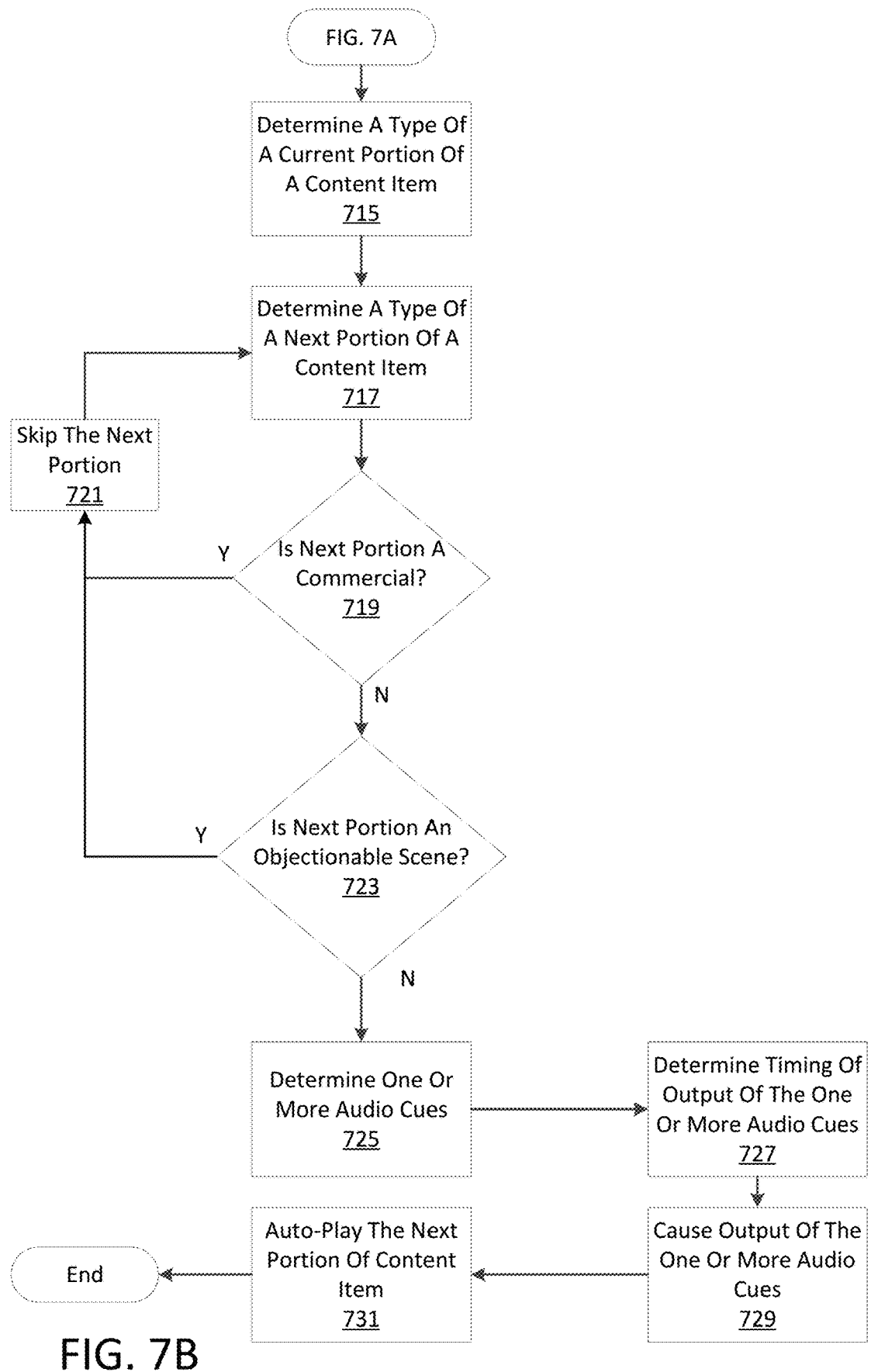

FIGS. 7A-7B are a flow chart of an example method for providing audio assistance during trick play. Steps of the method may comprise determining and outputting one or more audio cues during trick play. The method may provide a better user experience during trick play by (1) allowing users to customize settings, profiles, or preferences related to accessibility features, and (2) outputting one or more audio cues associated with the trick play operations. For example, the one or more audio cues may indicate an end of a current scene during trick play, so that the user may be informed when to stop a trick play operation. The description of FIGS. 7A-7B includes examples of computing devices that may perform various steps. However, as also described below, any or all of those steps (and/or other steps) may be performed by one or more other computing devices. One or more steps may be combined, sub-divided, omitted, or otherwise modified, and/or added to other steps. The order of steps may be modified.

At step 701, a primary content item may be extracted by the application server 107 from a video transport stream. The primary content item may, for example, be a normal speed (e.g., 1×) version of the content item that is associated with a forward play direction (e.g., playback of the content item from start to finish would correspond to playback of a content item from its beginning to its end). Video programs may be delivered as a series of data packets in one or more video transport streams, and may be later decoded by a receiver. The data packets may be extracted from the video transport stream. The data packets may comprise one or more video assets and one or more audio assets corresponding to the video assets. The extraction of the primary content item may also or alternatively be performed by an ingestion server in the external network 109, by a computing device in a premises (e.g., the gateway 111 or the other devices 113 in the premises 102a), and/or by another computing device.

At step 703, portions (e.g., one or more scenes) of the content item may be processed by the application server 107. The processing of step 703 may, for example, comprise identification and/or classification of one or more scenes in the content item, and determination of start and end times of the scenes. The processing of the portions of the content item may be performed at the ingestion level before the content item is made available to users for consumption. A scene may comprise a series of continuous images. One or more scenes in the content item may be identified and classified into one or more content types (e.g., violent scene, sex scene, gory scene, car chase scene, battle scene, embarrassing scene). Different methods may be used for the identification and/or classification of the scenes, and/or determination of start and end times of the scenes. For example, character recognition, pattern recognition, object recognition, speech recognition, text recognition based on the images in the content item, and/or other processing, may be used to determine the content type of the scenes of the content item, and/or start and end times of the scenes. The classification and identification of the scenes may be generated based on human input (e.g., people responsible for video quality control) and/or using machine learning techniques. The processing of the portions of the content item may also or alternatively be performed by an ingestion server in the external network 109, a computing device in a premises (e.g., the gateway 111 or the other devices 113 in the premises 102a), and/or another computing device.

At step 705, metadata associated with the content item and/or with trick play versions of the content item may be generated and/or otherwise determined by the application server 107. The metadata generated in step 705 (e.g., MPEG control data) may support control of trick play operations and may be determined based on classification of scenes in the content item. The metadata may be determined based on the identification and/or classification of the scenes of the content item determined in step 703 before a user inputs audio assistance information via a user interface. For example, the metadata may comprise descriptions of the scenes (e.g., content types of scenes) and timestamps. The timestamps may indicate start and end times of the programs and scenes, time information of I-frames, and/or additional details about the contents of the scene (e.g., a time duration of a scene).

Additionally or alternatively, the metadata may be determined based on audio assistance settings associated with a user or a group of users. For example, the application server 107 may retrieve the audio assistance settings and generate the metadata based on the user preference information in the audio assistance settings. The audio assistance settings may indicate the types of scenes and/or commercials that a user wishes to avoid or that users generally wish to avoid by using one or more trick play features. In order to output an audio cue during the output of the scenes that a user or users wish to avoid, time boundaries (e.g., a start and an end) of the scenes and types of the scenes in a content item may be determined before the output of the content item. For example, if the audio assistance settings indicate output of an audio cue when a violent scene is being fast-forwarded through, the metadata may comprise information indicating the association between the audio cue and the violent scene.

The metadata generated in step 705 may comprise information indicating scenes or commercials that some users may wish to avoid by using one or more trick play features. Based on historical user behaviors and/or other users' trick play operations, the application server 107 may determine one or more portions of the content item extracted in 701 that are likely to be avoided by certain users. The metadata may also comprise information indicating one or more audio cues for these portions of the content items. For example, the metadata may comprise mapping information indicating an association between the one or more audio cues and the different types of portions of the content item. The mapping information may comprise a one-to-one relation or one-to-many relation between the audio cues and the types of the portions of the content item. For example, one audio cue may correspond to more than one type of the portion of the content item.

The metadata may be updated and refined. For example, the metadata may be updated based on real-time user behaviors (e.g., skipping a portion of a content item or playback of a portion of a content item at a faster or slower speed) to predict user preferences and/or more accurately determine time boundaries of scenes and commercials. The application server 107 may collect user trick play behaviors and update the metadata to better predict content that the user wants to skip. For example, if a user has fast-forwarded through a violent scene one or more times, but the user preference information does not indicate that the user generally wishes to avoid violent content, the computing device may determine, based on a quantity of times that the user fast-forwards through a violent scene, that audio cues may be output before violent content is about to be output. Metadata associated with the violent content may be updated to associate the audio cues with the violent content for the user.

User behaviors when consuming a content item may be used to update or generate a new version of metadata that is provided to subsequent users. For example, users' prior trick play data may be collected and analyzed by the application server 107 to determine time boundaries of the scenes and commercials. For example, crowdsourced data indicating when users initiate trick play operations may be gathered from a plurality of different users. Based on the crowdsourced data, the computing device may determine the most likely time that a user initiates a trick play operation and may determine the time boundaries of the scenes and commercials based on when other users initiate trick play operations. In this way, the time boundaries of the scenes may be updated based on the crowdsourced data, and the metadata provided to subsequent users may be updated based on the updated time boundaries of the scenes.

FIG. 8 shows an example metadata file associated with trick play versions of a portion of a primary content item. The portion of the primary content item may be associated with one or more content classifiers (e.g., category: "violence," category: "sexual"). Optionally, the portion of the primary content item may be associated with other identifiers (e.g., battle_scene_1, sex_scene_1) for other purposes. Trick play content items (e.g., trick play versions of the portion of the primary content item) may be separate content items created to correspond to a primary content item so as to appear, for example, as fast-forward or rewind playback of the primary content item. The trick play content items may be generated based on the playback speed and direction. The trick play content items may correspond to portions of a primary content item that follow (e.g., for fast-forward trick play) or precede (e.g., for rewind trick play) the time in the content item when the user initiated trick play. The trick play content items may be generated before a trick play command is received. For example, before a trick play command is received, one or more trick play content items may be generated for different possible playback speeds and directions. A video may be made of a plurality of consecutive frames that are output at a predetermined output rate (e.g., 60 frames per second). The frames in the trick play content items may be removed or reordered to appear as though the corresponding portion of the primary content item is being replayed at a different speed and/or in a different direction. FIG. 8 shows a plurality of trick play content items with a different speed (e.g., 2×, 4×, 8×) and/or a different direction (e.g., forward, reverse).

The metadata determined in step 705 may indicate offsets of the portion of primary content item. The metadata may comprise information that indicates a descriptor and offsets of one or more portions of the content item. The original offsets (e.g., start and end times of the scenes determined in step 703) may indicate the start and end times of the portions of the primary content item that is played at 1× speed. In FIG. 8, a 5-minute scene that starts at 45:00 and ends at 50:00 in a primary content item has been classified as both a violent scene and a sexual scene and may have the original offsets [2700, 3000].

The metadata determined in step 705 may comprise information indicating the offsets of one or more portions of the primary content item for different playback speeds and directions. The offsets of one or more portions of the primary content item that are played back in different speeds and directions may be calculated. The offsets may be calculated to place the offsets of the scenes in the context of a trick play content item.

The offsets of the portions of the content item in a trick play content item may be calculated based on the playback speed and direction of the trick play content item. The start times may be rounded down to the nearest second, and the end times may be rounded up to the nearest second. For example, a 5-minute scene that starts at 1:47:27 in a movie that is played at 1× speed may have the original offsets [6447, 6747]. When that scene is played at 4× forward speed, the above 5-minute scene may happen at [1611, 1687] (6447/4, 6747/4) in the trick play content item. Assuming the original asset is exactly 2 hours long, the offsets for −2× trick play content item may be calculated to be [226, 377] (((7200−6747)/2), ((7200−6447)/2))). In some cases, only a beginning offset (e.g., a start time) or an ending offset (e.g., an end time) for each portion of the trick play content item may be calculated. For example, only the ending offset of a portion of trick play content item may be calculated, so that an audio cue may be output shortly before the ending offset. In this case, it is not necessary to calculate the beginning offset of the portion of the trick play content item. The generation and/or determination of the metadata may also or alternatively be performed by an ingestion server or another server in the external network 109, a computing device in a premises (e.g., the gateway 111 or the other devices 113 in the premises 102a), and/or another computing device.

At step 707, new audio files may be loaded or generated for one or more trick play content items by the application server 107. The new audio files may be indicated by the metadata determined in step 705, for example, as shown in FIG. 8. Trick play content items may be created without corresponding audio (e.g., audio from the portion of primary content item corresponding to the trick play content item is dropped). Alternatively, replacement audio files may be generated for the trick play operations. For example, new audio files at varying lengths shorter than the original audio asset (e.g., the audio portion from primary content item corresponding to the trick play content item) may be generated or selected for the trick play content item after a fast-forward command is received. The audio files may be silent or may comprise alternate audio (e.g., an advertisement).

The new audio files may be selected from a plurality of available audio files (e.g., a shorter version of the original audio asset, an advertisement audio) and may be inserted into the audio track of the trick play content item. For example, the new audio files may be inserted into the new trick play content item at locations corresponding to the calculated offsets of the trick play content item. The largest audio track that fits the new run length of the trick play content item may be chosen to align with the end of the trick play content item, leaving any empty space at the beginning of the audio track. This may allow a greater probability of a full audio impression as designed by the supplier of the commercials because a viewer might perform a fast-forward operation one or two seconds into commercials or objectionable scenes.

Further, the new audio files may comprise trick play assistive audio such as one or more audio cues. A computing device (e.g., the application server 107, the gateway 111, the display device 112, the other device 113, the personal computer 114, the laptop computer 115, the wireless device 116) may generate verbal audio cues and non-verbal audio cues based on the audio assistance settings (e.g., the option 607), and may record the generated audio cues in the computing device. The one or more audio cues may replace a portion of the new audio files (e.g., audio files corresponding to the last few seconds of the portions of the content item) when the user preference information indicates that one or more audio cues are associated with the portions of the content item. Additionally or alternatively, the one or more audio cues may be added to the new audio file by measuring from end of audio file. The audio cues may be inserted into the new audio file at locations near the end of corresponding portions of a content item based on the user preference information. For example, if the user preference information indicates a reaction time of 0.5 second, an audio cue may be placed into a corresponding audio file 0.5 second before the end of the trick play content item. Additionally or alternatively, audio cues may be output separately from the audio file for the trick play content item. For example, the gateway 111, the other devices 113, and/or other user devices (e.g., the personal computer 114, the laptop computer 115, the wireless device 116) may separately generate and superimpose audio cues over new audio files. The loading and the generation of the new audio files may also or alternatively be performed by an ingestion server or another server in the external network 109, a computing device in a premises (e.g., the gateway 111 or the other devices 113 in the premises 102a), and/or another computing device.

At step 709, a trick play command may be received by the gateway 111. The trick play command may indicate fast-forward or reverse play at one of a plurality of speeds (e.g., 2×, 4×, ½×, −2×, −4×, −¼×), or skip play at one of a plurality of time durations (e.g., jump 30 seconds forward or backwards in time). The trick play command may be associated with a portion of a content item (e.g., a user wishes to skip a violent scene). The portion of the content item may have been processed in step 703 and the trick play command may have been received from the user viewing the primary content item extracted in 701. The trick play command may, for example, be received from a visually-impaired user that wishes to initiate a trick play operation (e.g., a fast-forward trick play) to avoid and/or more quickly get past a scene that includes a content type that the user finds objectionable. The trick play command may be associated with content the user does not wish to see based on the user providing trick play input (e.g., remote control button push). The trick play command may be based on the user seeing/hearing start of scene that the user does not wish to watch, or based on other parts of the content that indicate to the user that the objectionable scene is coming (e.g., the user has previously viewed the primary content item and knows what comes after a current scene that is about to end). The trick play command may also or alternatively be received by the content server 106 or another server in the local office 103 or in the external network 109, another computing device in a premises (e.g., the other devices 113 in the premises 102a), and/or another computing device.

At step 711, a trick play content item may be caused to be output based on the trick play command by the gateway 111. For example, the trick play content item may be output by a computing device (e.g., display device 112, mobile device(s) 125, a sound system) after a trick play command is received. The metadata determined in step 705 and the audio cues loaded in 707 may be associated with the trick play content item. The trick play content item may also or alternatively be output by the content server 106 or another server in the local office 103 or in the external network 109, another computing device in a premises (e.g., the other devices 113 in the premises 102a), and/or another computing device.

At step 713, the gateway 111 may determine whether audio assistance features are enabled. For example, the gateway 111 may have previously received a first input associating one or more audio cues with one or more types of trick play (e.g., fast-forward, reverse, skip ahead/behind). Additionally or alternatively, the gateway 111 may have previously received a second input associating the one or more audio cues with one or more content types within one or more content items. The gateway 111 may determine what content types the user has previously indicated (e.g., via the user interfaces shown in FIGS. 3-6) as content types for which trick play audio assistance need to be provided. The determination of whether audio assistance features are enabled may also or alternatively be performed by the content server 106 or another server in the local office 103 or in the external network 109, another computing device in a premises (e.g., the other devices 113 in the premises 102a), and/or another computing device.

For example, the audio assistance features may be associated with the option 501 described in connection with FIG. 5. The audio assistance features may indicate the output of one or more audio cues (e.g., content alert option 505) associated with one or more types of content (e.g., different types of scenes, commercials, actions) during trick play. Further, the audio assistance features may comprise information indicating one or more audio cues associated with one or more types of scenes and/or commercials that users generally want to skip.

A user interface may present selectable options that allow the users to personalize the audio trick play experience and the sound of the audio cue (e.g., a beep or a series of beeps, next scene, or jumping to the next scene). Examples of the user interface are described in connection with FIGS. 3-6.

If it is determined in 713 that the audio assistance features are not enabled ("N"), no audio cues may be output during the output of the trick play content item. If it is determined in 713 that the audio assistance features are enabled ("Y"), step 715 may be performed. Referring to FIG. 7B, at step 715, a content type of a current portion of a content item (e.g., a portion of the primary content item corresponding to the trick play content item that is currently being output) may be determined by the gateway 111. For example, the content type of the current portion of the content item may be determined based on the metadata associated with the current portion of the content item (e.g., the metadata determined in step 705). Additionally or alternatively, the content type of the current portion of the content item may be determined in real-time based on elements extracted from the current portion. Similar to the techniques used in pre-processing the scenes, character recognition, pattern recognition, object recognition, speech recognition, text recognition based on the images in the current portion, and/or other processing, may be used to determine the content type of the current portion of the content item. The determination of the content type of the current portion of the content item may also or alternatively be performed by the content server 106 or another server in the local office 103 or in the external network 109, another computing device in a premises (e.g., the other devices 113 in the premises 102a), and/or another computing device.

At step 717, a content type of a next portion of the content item (e.g., a portion of the primary content item immediately following the current portion) may be determined by the gateway 111. Similar to the determination of the content type of the current portion of the content item in step 715, the content type of the next portion of the content item may be determined based on the metadata associated with the next portion and/or elements extracted in real-time from the current portion. The metadata associated with the next portion of the content item may comprise information indicating a start time of the next portion of the content item, and the start time may be the same or almost the same as an end time of the current portion of the content item. The determination of the content type of the next portion of the content item may also or alternatively be performed by the content server 106 or another server in the local office 103 or in the external network 109, another computing device in a premises (e.g., the other devices 113 in the premises 102a), and/or another computing device.

At step 719, the gateway 111 may determine whether the next portion of the content item is a commercial. If the next portion of the content item is determined to be a commercial, an audio cue may be output to alert the user that next portion of the content item is a commercial, so that the user may choose to take action to avoid watching and/or hearing the next portion. Additionally or alternatively, if the next portion of the content item is determined to be a commercial, step 721 may be performed. The determination of whether the next portion of the content item is a commercial may also or alternatively be performed by the content server 106 or another server in the local office 103 or in the external network 109, another computing device in a premises (e.g., the other devices 113 in the premises 102a), and/or another computing device. At step 721, the gateway 111 may cause the next portion of the content item to be skipped after the end of the current portion of the content item. For example, based on the user preference information (e.g., the user wishes to continue forward-forwarding if the next portion of the content item is a commercial) stored in the gateway 111, the next portion of the content item may be skipped automatically without any further user input (e.g., an additional trick play command to skip the commercial). A user may wish to skip some types of the commercials and may customize the settings on a user interface (e.g., user interface 610). The next portion of the content item may be skipped together with the current portion of the content item based on the trick play command. The skipping of the next portion of the content item may also or alternatively be caused by the content server 106 or another server in the local office 103 or in the external network 109, another computing device in a premises (e.g., the other devices 113 in the premises 102*a*), and/or another computing device.

If the next portion of the content item is determined not to be a commercial, step 723 may be performed. At step 723, the gateway 111 may determine whether the next portion of the content item comprises a content type the user indicated, via an audio assistance setting, that the user wishes to watch or hear (e.g., content types that are not indicated to be avoided). For example, based on the user preference information stored in the computing device, a user may wish to skip certain types of scenes and may wish to resume watching if the next portion of the content item is an unobjectionable scene (e.g., content types that are not indicated to be avoided). If the next portion of the content item is an unobjectionable scene, step 725 may be performed. If the next portion of the content item is an objectionable scene, an audio cue may be output to alert the user that next portion of the content item is an objectionable scene, so that the user may choose to take action to avoid watching and/or hearing the next portion. Additionally or alternatively, step 721 may be performed. The determination of whether the next portion of the content item comprises a content type the user indicated that the user wishes to watch or hear may also or alternatively be performed by the content server 106 or another server in the local office 103 or in the external network 109, another computing device in a premises (e.g., the other devices 113 in the premises 102*a*), and/or another computing device.

Step 719 and step 721 may be combined into one step and repeated until a next portion of the content item is determined to be an unobjectionable scene and/or that is not a commercial. Additionally or alternatively, "commercial" may be added as but another content type that a user may indicate (e.g., via one or more user interfaces such as in FIGS. 3-6) a desire to skip, and step 719 omitted. A user may be permitted to continue (e.g., not alerted via an audio cue to stop) trick play until a next portion of the content item is an unobjectionable scene and/or is not a commercial. The portions of the content item before the next scene may be skipped without any interruption in trick play through content that a user wishes to avoid.

At step 725, one or more audio cues may be determined by the gateway 111. The audio cues may be determined based on (i) the metadata associated with the current portion of the content item or the next portion of the content item, and/or (ii) the user preference information (e.g., audio assistance features). For example, the user preference information may indicate the content types that the user wishes to avoid, and the metadata associated with the current portion of the content item (e.g., the metadata file shown in FIG. 8) may indicate the content type of the current portion of the content item. If the content type of the current portion of the content item indicated by the metadata matches the content type that the user wishes to avoid, one or more audio cues may be determined and output. The audio cues may indicate the progress (e.g., an approaching end time) of the one or more types of scenes or commercials during trick play. Additionally or alternatively, the audio cues may indicate information associated with the trick play command and the content item based on the user preference information. For example, an audio cue may indicate an end of the current portion of the content item that is associated with the trick play command, so that the user may stop performing the trick play operation and start watching the next portion of the content item.

For example, an audio cue may indicate that the next portion of the content item is an unobjectionable scene and thus indicate that the user may wish to stop the trick play operation (e.g., fast-forwarding through a current portion of the content item). Additionally and alternatively, one type of audio cue may indicate that current portion of the content item being fast-forwarded is about to end, and then a different type of audio cue (e.g., a separate tone) may indicate whether or not the next portion of the content item is an unobjectionable scene. For example, a first sound may indicate that the end of the current portion of the content item being fast-forwarded is approaching, and a second sound may indicate that the next portion of the content item is an objectionable scene, or a third sound may indicate that the next portion of the content item is an unobjectionable scene. If there are two or more objectionable scenes in a row, a type of audio cue may indicate that the upcoming portion of the content item is an objectionable scene before each of the upcoming portion of the content item, so that the user may be informed to continue the trick play operation. Alternatively, no audio cues may be output if a series of upcoming portions of the content item are objectionable scenes or commercials. Instead, a single audio cue may be output shortly before next unobjectionable scene starts.

If a rewind trick play command indicates rewinding to a previous portion (e.g., a scene that users generally want to watch again) of the content item, one or more audio cues (e.g., a beep, or an audio message "rewinding to a touchdown") may indicate that the current portion of the content item is being skipped, or has been skipped based on the trick play command, and/or that part of (e.g., middle and end parts) the previous portion of the content item is being skipped, or has been skipped. In addition, an audio cue may indicate a start of the previous portion of the content item.

The audio cues may comprise a pre-recorded verbal content alert (e.g., "violence warning") for the next portion of the content item based on the user preference information (e.g., the user would like a warning to be presented shortly before the start a violent scene) before the start of the next portion of the content item, which may prompt the user to skip the next portion of the content item without actually watching or hearing it.

Further, different sounds may be output for different types of content or different types of scenes and commercials based on the user preference settings (e.g., the option 607). For example, a high-pitched beep may indicate an objectionable scene and a low-pitched beep may indicate a commercial. In this way, the audio cues may provide additional information to the users about the content of the video programs. The determination of the one or more audio cues may also or alternatively be performed by the content server 106 or another server in the local office 103 or in the external network 109, another computing device in a premises (e.g., the other devices 113 in the premises 102*a*), and/or another computing device.

At step 727, a timing of output of the one or more audio cues may be determined by the gateway 111. The timing may be determined based on a time boundary of the current portion of the content item and/or one or more next portions of the content item. If there is only one objectionable scene being fast-forwarded through, then the audio cues may be output based on the end of a trick play content item corresponding to the objectionable scene. If there are multiple objectionable scenes and/or commercials determined in steps 715-723, the timing(s) of output of the audio cues may be determined based on the user preference information. For example, if the audio assistance settings indicate output of only a single audio cue near the end of a series of objectionable scenes and/or commercials, then the timing of the output of the audio cue may be determined based on the end of a trick play content item corresponding to the last scene and/or commercial in the series of objectionable scenes and/or commercials. If the audio assistance settings indicate output of one or more audio cues near the end of each scene or commercial being fast-forwarded through, then the timings for those audio cues may be determined based on the end of trick play content items corresponding to each scene and/or commercial in the series of objectionable scenes and/or commercials. For example, one or more audio cues, which indicate an end time of the current portion of the content item that is being fast-forwarded through, may be output shortly before (e.g., 0.5 second, 1 second) the current portion of the content item ends. The time boundaries of the current portion of the content item may be indicated by the metadata associated with the current portion of the content item. For example, the calculated offsets of the current portion of the content item may indicate a start and end time of the current portion in the content item.

The timing of output of the audio cues may be determined based on user reaction time set on a user interface. In this way, the user may have some reaction time (e.g., 0.5 second, 1 second) to stop performing the trick play operation (e.g., release a trick play control button on a remote control) and resume watching the next portion of the content item. The reaction time may be set on a user interface (e.g., user interface 610) by the users, and may be updated based on the user behaviors and/or crowdsourced data gathered from a plurality of different users. For example, based on the historical reaction times collected from a computing device (e.g., the application server 107, the other devices 113), the computing device may analyze the user reaction times. The computing device may calculate an average reaction time for the user based on the collected reaction times and update the reaction time set on the user interface. Additionally or alternatively, the computing device may gather user reaction times from a plurality of users that have enabled the audio assistance features, and may determine a reaction time that best corresponds to the reaction time of a majority of the users based on the gathered data.

In another example, the audio cues, which indicate a start time of the next portion of the content item, may be output shortly before (e.g., 0.5 second, 1 second) the start of the next portion of the content item. The timing of output of the audio cues may also be determined based on the user reaction time. For example, if a user reaction time is 0.5 second, the audio cues may be output 0.5 second before the start of the next portion of the content item. Additionally or alternatively, audio cues might not be output during the skipping of any of the content. Instead, an audio cue may be output before the start of an unobjectionable scene. For example, an audio cue may be output after a series of commercials and before the beginning of regular programming. The determination of the timing of the output of the one or more audio cues may also or alternatively be performed by the content server 106 or another server in the local office 103 or in the external network 109, another computing device in a premises (e.g., the other devices 113 in the premises 102a), and/or another computing device.

At step 729, the one or more audio cues may be caused to be output by the gateway 111. The audio cues may be output at the timing determined at step 727. Further, the audio cues may be output by a computing device (e.g., display device 112, mobile device(s) 125, a sound system). The computing device may extract audio cues stored locally and output the audio cues at the timing determined at step 727. Additionally or alternatively, the computing device may output the audio cues comprised in the audio files corresponding to the trick play content item.

In some situations, however, audio cues might not be output during trick play even if the audio assistance feature is enabled by a user. For example, when a duration of a portion of a content item does not satisfy a threshold (e.g., the duration is shorter than, for example, 3 seconds), it may not be appropriate to output an audio cue because it might not provide user with enough reaction time to stop the trick play operation. One or more thresholds of the duration of the portion of the content item may be determined by the computing device or a user for the output of the audio cues. The one or more audio cues may also or alternatively be caused to be output by the content server 106 or another server in the local office 103 or in the external network 109, a computing device in a premises (e.g., the other devices 113 in the premises 102a), or another computing device.

The audio cues caused to be output at step 729 may alert the user to take action to stop trick play. Additionally or alternatively, 731 may be performed. At step 731, the next portion of the content item may be caused to be automatically output by the gateway 111. For example, after a trick play command to skip a current portion of the content item is received and a next portion of content item is determined to be an unobjectionable scene, the time boundary of the next portion of the content item may be aligned with the end of the trick play content item being output and the next portion of the content item may be automatically output without any additional user input (e.g., without the user providing a separate input to indicate performing of the trick play operation should stop). The computing device may automatically cause the stop of the trick play operation before the output of the next portion of content item. An audio cue may be output shortly before the automatic output of the next portion of the content item to inform the user that the next unobjectionable portion is about to play.

Step 731 may be performed if the user preference information indicates automatic skipping of the one or more types of scenes (e.g., auto-play at end of skipped content 609 is enabled). Based on the user preference information and before a start of the next unobjectionable scene, one or more audio cues may be output to indicate the skipping of the current portion of the content item and/or the automatic output of the next portion of the content item. The next portion of the content item may also or alternatively be caused to be output by the content server 106 or another server in the local office 103 or in the external network 109, another computing device in a premises (e.g., the other devices 113 in the premises 102a), and/or another computing device.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A method comprising:
receiving, by a computing device, information indicating a user preference regarding one or more types of content;
receiving a trick play command to skip a current segment of a content item;
causing output of a subsequent segment of the content item, wherein the causing is based on:
the trick play command;
the information indicating the user preference regarding one or more types of content; and
information indicating a type of the subsequent segment; and
outputting a message indicating automatic output of the subsequent segment.

2. The method of claim 1, wherein the current segment comprises a commercial scene.

3. The method of claim 1, further comprising:
causing trick play output of the current segment,
wherein the causing output of the subsequent segment of the content item comprises: causing output of the subsequent segment by aligning a boundary of the subsequent segment with an end of the trick play output of the current segment.

4. The method of claim 1,
wherein a timing of the output of the message is based on a start time of the subsequent segment.

5. The method of claim 1, wherein the information indicating the user preference regarding one or more types of content indicates that the current segment of the content item is objectionable to a user, and that the subsequent segment of the content item is not objectionable to the user.

6. The method of claim 1,
wherein the message comprises an audio cue.

7. A method comprising:
receiving, by a computing device, information indicating a user preference regarding one or more types of content;
receiving a trick play command during output of a content item at a first rate;
switching, based on the trick play command, playback of the content item from the first rate to a second rate; and
based on the information and on information indicating content types of one or more subsequent segments of the content item, selecting a subsequent segment of the content item and switching playback of the content item from the second rate back to the first rate; and
causing output of the subsequent segment by aligning a boundary of the subsequent segment with an end of the playback of the content item at the first rate.

8. The method of claim 7, further comprising:
receiving, by the computing device, a user input authorizing automatic switching of playback of the content item from the first rate to the second rate.

9. The method of claim 7, wherein the switching playback of the content item from the second rate back to the first rate comprises causing output of the subsequent segment of the content item.

10. The method of claim 7, further comprising:
outputting a message indicating automatic output of the subsequent segment,
wherein the message comprises an audio cue that alerts a user that the subsequent segment of the content item is approaching.

11. The method of claim 10,
wherein the message comprises an audio cue that alerts a user of the switching playback of the content item from the first rate to the second rate.

12. The method of claim 10,
wherein a timing of the output of the message is based on a start time of the subsequent segment.

13. The method of claim 7,
wherein a current segment comprises a commercial scene.

14. The method of claim 7,
wherein the information indicating the user preference regarding one or more types of content indicates that a current segment of the content item is objectionable to a user, and that the subsequent segment of the content item is not objectionable to the user.

15. The method of claim 7, further comprising:
based on a first user preference selecting a first tone for a first type of content and a second tone for a second type of content.

16. An apparatus comprising:
one or more processors; and
memory storing instructions that, when executed by the one or more processors, cause the apparatus to:
receive information indicating a user preference regarding one or more types of content;
receive a trick play command to skip a current segment of a content item;
cause output of a subsequent segment of the content item, wherein the causing is based on:
the trick play command;
the information indicating the user preference regarding one or more types of content; and
information indicating a type of the subsequent segment; and
output a message indicating automatic output of the subsequent segment.

17. The apparatus of claim 16, wherein the instructions, when executed by the one or more processors, cause the apparatus to:
cause trick play output of the current segment,
wherein the causing output of the subsequent segment of the content item comprises:
causing output of the subsequent segment by aligning a boundary of the subsequent segment with an end of the trick play output of the current segment.

18. The apparatus of claim 16,
wherein a timing of the output of the message is based on a start time of the subsequent segment.

19. The apparatus of claim 16, wherein the information indicating the user preference regarding one or more types of content indicates that the current segment of the content item is objectionable to a user, and that the subsequent segment of the content item is not objectionable to the user.

20. The apparatus of claim 16,
wherein the message comprises an audio cue.

* * * * *